United States Patent [19]
Li et al.

[11] Patent Number: 5,473,599
[45] Date of Patent: Dec. 5, 1995

[54] STANDBY ROUTER PROTOCOL

[75] Inventors: Anthony J. Li, Sunnyvale; Bruce A. Cole, Menlo Park, both of Calif.

[73] Assignee: Cisco Systems, Incorporated, Menlo Park, Calif.

[21] Appl. No.: 231,330

[22] Filed: Apr. 22, 1994

[51] Int. Cl.$^6$ .................................................... H04J 3/14
[52] U.S. Cl. ................... 370/16; 370/85.13; 395/182.02; 395/182.11; 395/200.15
[58] Field of Search ..................................... 370/16, 85.13, 370/85.14; 371/8.1, 8.2, 9.1; 340/825.03

[56] References Cited

U.S. PATENT DOCUMENTS

| | | | |
|---|---|---|---|
| 4,692,918 | 9/1987 | Elliot et al. ................................. | 370/16 |
| 5,016,244 | 5/1991 | Massey, Jr. et al. ....................... | 370/16 |
| 5,018,133 | 5/1991 | Tsukakoshi et al. ....................... | 370/16 |
| 5,218,600 | 6/1993 | Schenkyr et al. ........................... | 370/16 |

OTHER PUBLICATIONS

Release notes for 3Com Corporation, "NETBuilder Family Bridge/Router", pp. 27–29, (Mar. 1994).
J. Moy, RFC 1247 "OSPF Version 2", Jul. 19, 1991.
D. Oran, RFC 1142 "OSI IS–IS Intra–domain Routing Protocol", Feb. 1990.
Black, Uyless, "TCP/IP and Related Protocols", McGraw-Hill, Inc., pp. 226–249, 1992.

Primary Examiner—Douglas W. Olms
Assistant Examiner—Min Jung
Attorney, Agent, or Firm—Hickman & Beyer

[57] ABSTRACT

A system and protocol are provided for routing data packets from a host on a LAN through a virtual address belonging to a group of routers. The host is configured to point to the virtual address so that the packets it sends out of its LAN are always directed to a virtual router which may be any one of the group of routers. An active router in the group of routers emulates the virtual router. A standby router, also from the group of routers, backs up the active router so that if the active router becomes inoperative, the standby router automatically begins emulating the virtual router. The host router does not know which router from the group is actually handling the data packets it sends. If the standby router becomes inoperative or takes over for the active router, other routers in the group hold an election to determine which of them should take over for the standby router.

31 Claims, 7 Drawing Sheets

STATE

| Event | Virgin | Learn | Listen | Speak | Standby | Active |
|---|---|---|---|---|---|---|
| 1 config | StartAT StartST Learn or Listen? | | | | | |
| 2 unconfig | ClearAT ClearST Virgin | ClearAT ClearST Virgin | ClearAT ClearST Virgin | ClearAT ClearST Virgin | ClearAT ClearST Virgin | ClearAT ClearST Resign Virgin |
| 3 ATexp | | | StartAT StartST Speak | | Clear AT Active | |
| 4 Higher Hello | | | | Listen | StartST Listen | |
| 5 Higher Hello | | snoop StartAT StartST Listen | snoop StartAT | snoop StartAT | snoop StartAT | StartAT StartST Speak |
| 6 Lower Active | | snoop StartAT StartST Listen | snoop StartAT Coup ClearAT? Active? StartsST | snoop StartAT Coup ClearAT? Active? StartsST | snoop StartAT Coup ClearAT? Active? | Coup |
| 7 Resign | | | StartAT StartST Speak | StartAT | ClearAT Active | |
| 8 Coup | | | | | | Resign StartAT StartST Speak |
| 9 STexp | | | StartST Speak | Clear ST Standby | | |
| 10 Higher Standby | | | StartST | StartST Listen | StartST Listen | StartST |
| 11 Lower Standby | | | StartST Speak | ClearST Standby | | StartST |

Fig. 7

STANDBY ROUTER PROTOCOL

BACKGROUND OF THE INVENTION

The present invention relates to network systems having redundant routers for receiving packets from a host on a LAN. More specifically, the invention provides a "standby group" of routers including an "active" router which handles packets from the host and a "standby" router which backs up the active router should it fail.

Local area networks (LANs) are commonly connected with one another through one or more routers so that a host (a PC or other arbitrary LAN entity) on one LAN can communicate with other hosts on different LANs. Typically, the host recognizes only those addresses for the entities on its LAN. When it receives a request to send a data packet to an address that it does not recognize, it communicates through a router which determines how to direct the packet between the host and the address. Unfortunately, a router may, for a variety of reasons, become inoperative (e.g., a power failure, rebooting, scheduled maintenance, etc.). When this happens, the host communicating through the inoperative router may still remain connected to other LANs if it can send packets to another router connected to its LAN.

Various protocols have been devised to allow a host to choose among routers in a network. Two of these, Routing Information Protocol (or RIP) and ICMP Router Discovery Protocol are examples of protocols that involve dynamic participation by the host. The host in a RIP system receives the periodic routing protocol packets broadcast by the various routers on the system and thereby keeps track of available routers. If a router stops sending protocol packets, the host assumes that the router is no longer operative and stops sending data through that router. Unfortunately, routing protocol packets contain relatively large amounts of data including all the specific routes known by the routers. Because the host periodically receives these rather large packets, the system bandwidth is reduced.

In ICMP Router Discovery, the host keeps track of operative routers by listening for router reachability messages. These messages contain a list of IP addresses of usable routers together with preference values for those routers. Because these messages are relatively small (in comparison to routing protocol packets received by the host in RIP) and are not coupled time-wise with any routing protocol, the bandwidth utilization is improved in comparison with RIP. Nevertheless, both RIP and Router Discovery require that the host be dynamically involved in the router selection, thus reducing performance and requiring special host modifications and management.

In a widely used and somewhat simpler approach, the host recognizes only a single "default" router. In this approach, the host is configured to send data packets to the default router when it needs to send packets to addresses outside its own LAN. It does not keep track of available routers or make decisions to switch to different routers. This requires very little effort on the host's part, but has a serious danger. If the default router fails, the host can not send packets outside of its LAN. This will be true even though there may be a redundant router able to take over because the host does not know about the backup. Unfortunately, such systems are now widely used in mission critical applications such as stock trading.

Other systems in which the host becomes overly dependent upon a single router have similar problems. For example, in a "proxy ARP" protocol, a router may give a host its address in response to the host's request for an address outside of its local LAN. Thereafter, the host directs its traffic through that router. If the host does not often update its ARP table entry (which lists physical addresses of available routers), it may continue to assume that it should send all data packets through the same router, even after that router fails. Unfortunately when this happens, the host can no longer communicate outside its own LAN.

In view of the above, it would be desirable to have a network system in which the hosts are not dynamically involved in router selection, and yet are able to handle failures by an assigned router.

SUMMARY OF THE INVENTION

The present invention provides a system and protocol for routing data packets from a host on a LAN through a virtual router. The host is configured so that the packets it sends to destinations outside of its LAN are always addressed to the virtual router. The virtual router may be any physical router elected from among a "standby group" of routers connected to the LAN. The router from the standby group that is currently emulating the virtual router is referred to as the "active" router. Thus, packets addressed to the virtual router are handled by the active router. A "standby" router, also from the group of routers, backs up the active router so that if the active router becomes inoperative, the standby router automatically begins emulating the virtual router. This allows the host to always direct data packets to an operational router without monitoring the routers of the network.

In one aspect, the present invention provides a router for use in the described standby group. Such a router includes (1) a primary router address; (2) a group virtual address which is adopted by the router when it becomes the active router of the network segment; (3) means for assuming the group's virtual address; (4) means for issuing a coup message to notify a current active router that the router will attempt to replace the active router; and (5) means for disabling the means for issuing a coup message. In preferred embodiments, each router of this invention has the capability of adopting both the standby and active statuses depending upon the current circumstances in the network.

The coup message provides a router with the ability to take over the role of active router should it determine that it has a priority higher than that of the active router. Each router is configured with a priority. Generally, the router with the highest priority is the active router. However, if a new router (i.e., a router that has neither the active nor standby status) having the highest priority enters the network group, it becomes active router only through a defined protocol. This involves sending a coup message containing the new router's priority. When the active router determines that the router sending the coup message has a higher priority, the active router sends a resign message and removes the group's virtual address. When this occurs, the active router ceases to emulate the virtual router—a role now taken by the new router. In some cases, it will be desirable for a router to be configured so that it will not send coup messages in this situation. Thus, the routers of this invention preferably include means for disabling the means for sending coup messages in a manner such that a new higher priority router entering the group does not automatically preempt an active router.

A router can determine when the active or standby router is no longer operating by listening for "hello" messages from these routers. Thus, the routers of this invention preferably include means for sending and receiving hello messages. The hello message preferably includes a router priority, a router status (e.g., active, standby, or new), and the group virtual address. Thus, the listening routers can determine a speaking router's status and priority. If a new router determines that the priority of the active router is lower than its own, it may send a coup message. If a new router no longer hears hello messages issuing from the active or standby router, it can assume that router is no longer operational. Thereafter, the new router together with other new routers can elect and install a replacement standby and/or replacement active router. This election preferably is performed automatically, without requiring that a user intervene to specify the replacement router.

In another aspect, the present invention provides a method for backing up an active router. The method includes the following steps: (1) specifying an active router for routing data packets from the host; (2) specifying a standby router which backs up the active router; (3) causing the active router to emulate a virtual router; (4) causing the host to address data packets to the virtual router; and (5) automatically selecting a new active router based upon a comparison of the priorities of the multiple routers in the network. In the case of a coup, the step of selecting a new active router includes the following steps: (a) detecting a coup message from a new router indicating that it wishes to take over as the active router; and (b) selecting the new router as the active router if its priority is higher than that of the active router. In the case where the active router simply leaves the system (due to a bad connection for example), the step of selecting a new active router includes the following steps: (a) determining when an active router has left the network (by no longer hearing hello messages from the active router, for example); and (b) if the active router has in fact left the network, selecting the standby router as the active router. Note that in this case, the standby router should automatically take over for the active router, and the other routers in the system must then decide among themselves which one will become the new standby router.

These and other features and advantages of the present invention will be presented in more detail in the following specification of the invention and the figures.

BRIEF DESCRIPTION OF THE DRAWINGS

FIG. 7 is a chart showing the events which cause a router of FIG. 6 to change states.

DESCRIPTION OF THE PREFERRED EMBODIMENTS

1. Definitions

Figure 1:
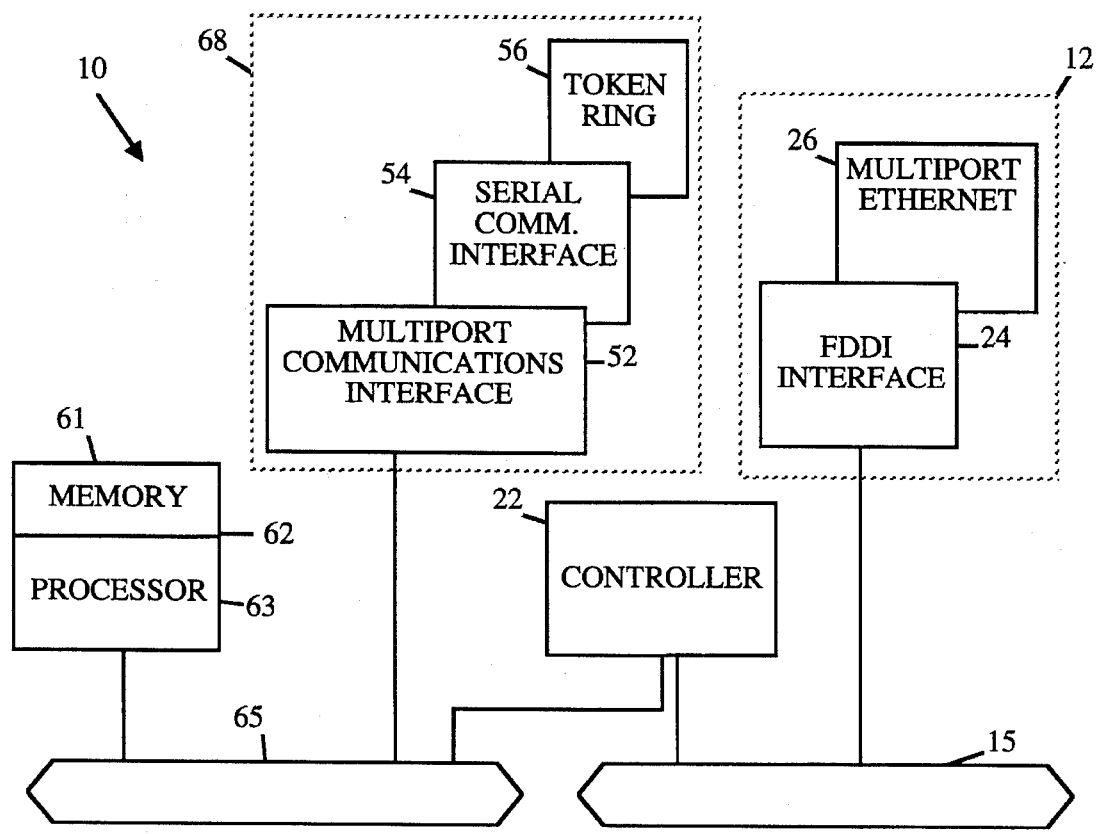
FIG. 1 is a block diagram of a router that may be used in this invention.

The following terms are used in the instant specification. Their definitions are provided to assist in understanding the preferred embodiments described herein.

A "host" is a PC or other arbitrary network entity residing on a LAN and communicating with network entities outside of its own LAN through a router or bridge.

A "router" is a piece of hardware which operates at the network layer to direct packets between various LANs of the network. The network layer generally allows pairs of entities in a network to communicate with each other by finding a path through a series of connected nodes.

An "IP (internet protocol) address" is a network layer address for a device operating in the IP suite of protocols. The IP address is typically a 32 bit field, at least a portion of which contains information corresponding to its particular network segment. Thus, the IP address of a router may change depending upon its location in a network.

A "MAC address" is an address of a device at the sublayer of the data link layer, defined by the IEEE 802 committee that deals with issues specific to a particular type of LAN. The types of LAN for which MAC addresses are available include token ring, FDDI, and ethernet. A MAC address is generally intended to apply to a specific physical device no matter where it is plugged into the network. Thus, a MAC address is generally hardcoded into the device—on a router's ROM, for example. This should be distinguished from the case of a network layer address, described above, which changes depending upon where it is plugged into the network. MAC is an acronym for Media Access Control.

A "virtual address" is an address shared by a group of real network entities and corresponding to a virtual entity. In the context of this invention, one router frown among a group of routers emulates a virtual router by adopting one or more virtual addresses, and another entity (usually a host) is configured to send data packets to such virtual address(es), regardless of which router is currently emulating the virtual router. In preferred embodiments, the virtual addresses encompasses both MAC layer and network layer addresses. Usually various members of the group each have the capability of adopting the virtual address (although not at the same time) to emulate a virtual entity.

A "packet" is a collection of data and control information including source and destination node addresses, formatted for transmission from one node to another. In the context of this invention, it is important to note that hosts on one LAN send packets to hosts on another LAN through a router or bridge connecting the LANs.

2. Overview

The invention employs various process steps involving data manipulation. These steps require physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, variables, characters, data packets, or the like. It should be remembered, however, that all of these and similar terms are to be associated with the appropriate physical quantities and are merely convenient labels applied to these quantities.

Further, the manipulations performed are often referred to in terms, such as estimating, running, selecting, specifying, determining, or comparing. In any of the operations described herein that form part of the present invention, these operations are machine operations. Useful machines for performing the operations of the present invention include general purpose and specially designed routers or other similar devices. In all cases, there should be borne in mind the distinction between the method of operations in operating a router or computer and the method of computation itself. The present invention relates to method steps for operating a router in processing electrical or other physical signals to generate other desired physical signals.

The present invention also relates to an apparatus for performing these operations. This apparatus may be specially constructed for the required purposes, or it may be a general purpose programmable machine selectively activated or reconfigured by a computer program stored in memory. The processes presented herein are not inherently related to any particular router or other apparatus. In particular, various general purpose machines may be used with programs written in accordance with the teachings herein, or it may be more convenient to construct a more specialized apparatus to perform the required method steps. For example, the routers of this invention are preferably specially configured models AGS, MGS, CGS, TGS, IGS, 2000, 3000, 4000, and 7000 available from Cisco Systems, Inc. of Menlo Park, Calif. The general structure for a variety of these machines will appear from the description given below.

Referring now to FIG. 1, a router 10 of the present invention includes a master central processing unit (CPU) 62, low and medium speed interfaces 68, and high speed interfaces 12. In preferred embodiments, the CPU 62 is responsible for such router tasks as routing table computations and network management. It may include one or more microprocessor chips 63 selected from complex instruction set computer (CISC) chips (such as the Motorola 68040 microprocessor), reduced instruction set computer (RISC) chips, or other available chips. In a preferred embodiment, a memory 61 (such as non-volatile RAM and/or ROM) also forms part of CPU 62. However, there are many different ways in which memory could be coupled to the system.

The interfaces 12 and 68 are typically provided as interface cards. Generally, they control the sending and receipt of data packets over the network and sometimes support other peripherals used with the router 10. The low and medium speed interfaces 68 include a multiport communications interface 52, a serial communications interfaces 54, and a token ring interface 56. The high speed interfaces 12 include an FDDI interface 24 and a multiport ethernet interface 26. Preferably, each of these interfaces (low/medium and high speed) includes (1) a plurality of ports appropriate for communication with the appropriate media, and (2) an independent processor such as the 2901 bit slice processor (available from Advanced Micro Devices corporation of Santa Clara Calif.), and in some instances (3) volatile RAM. The independent processors control such communications intensive tasks as packet switching and filtering, and media control and management. By providing separate processors for the communications intensive tasks, this architecture permits the master microprocessor 62 to efficiently perform routing computations, network diagnostics, security functions, etc.

The low and medium speed interfaces are coupled to the master CPU 62 through a data, control, and address bus 65. High speed interfaces 12 are connected to the bus 65 through a fast data, control, and address bus 15 which is in turn connected to a bus controller 22. The bus controller functions are provided by a processor such as a 2901 bit slice processor.

Although the system shown in FIG. 1 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router.

Figure 2A:
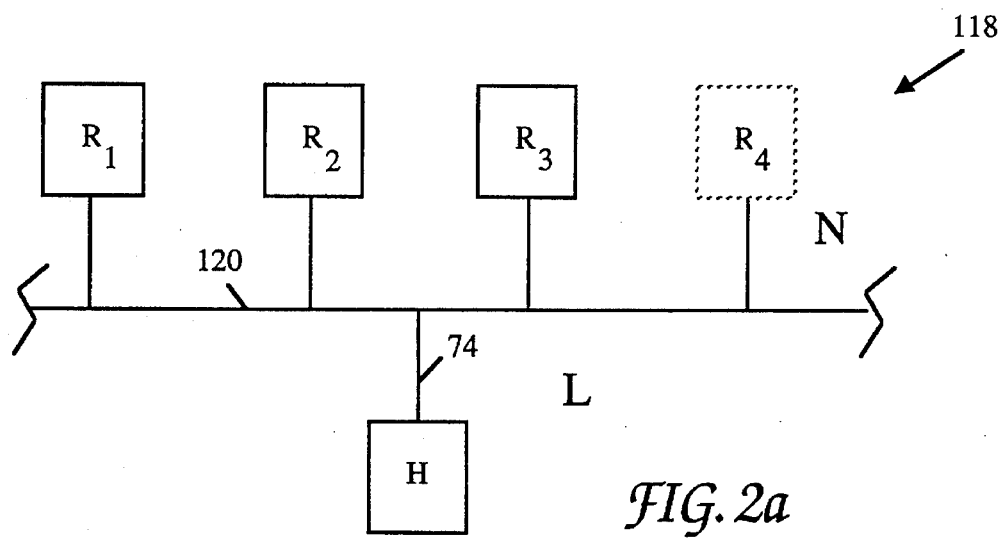
FIG. 2a is a block diagram of a network segment in accordance with this invention having a standby group of routers and a virtual router for the standby group.
Figure 2B:
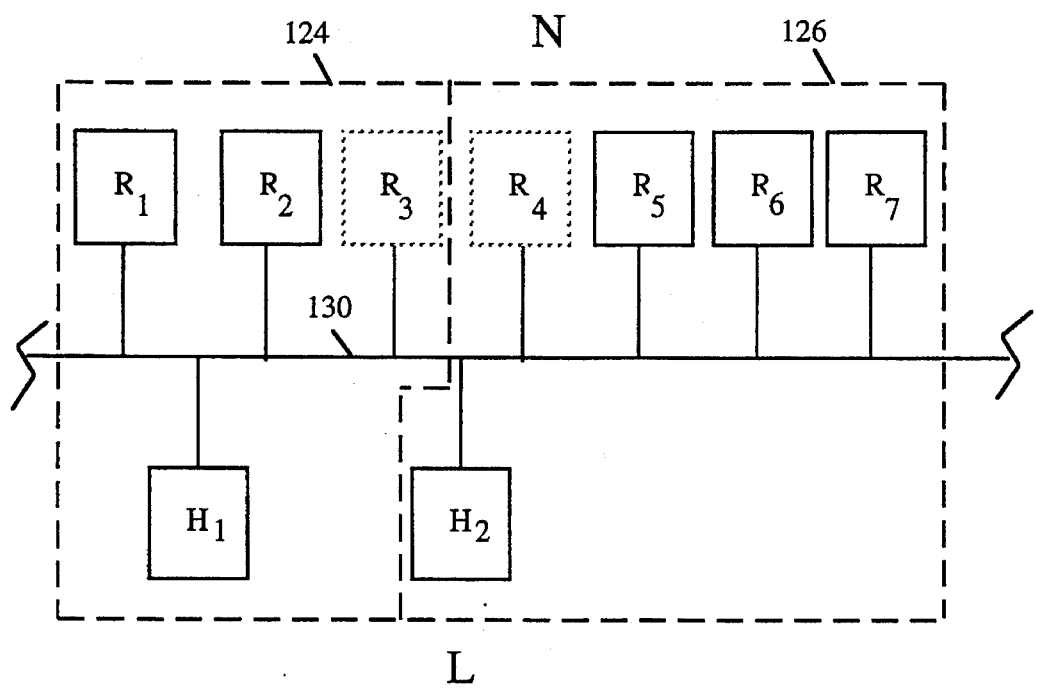
FIG. 2b is a block diagram of a network segment having two standby groups of routers, each having a router which emulates a group virtual router.

FIGS. 2a and 2b show network segments including routers R interconnecting a host H on a LAN L with one or more other LANs in a network N. For the purposes of this invention, any LAN supporting broadcast and link layer addressing independent of exact physical location is acceptable. It is to be understood that the LAN L includes other network entities in addition to the host H, but in the interest of simplifying the figures, these entities are not shown. Further, it should be understood that the routers in FIGS. 2a and 2b are connected to at least one other LAN or WAN in addition to LAN L shown in the figures. Still further, for this invention, any data processing device in a LAN may be considered a host. For example, the host H may be a terminal, personal computer, workstation, minicomputer, mainframe, etc. It should be understood that the hosts may be manufactured by different vendors and may also use different operating systems such as MS-DOS, UNIX, OS/2, MAC OS and others.

Referring to FIG. 2a, a network segment 118 includes host H on LAN L, a group of routers (including routers R1, R2, and R3) on cable 120, and virtual router R4. Host H is connected to routers R1, R2, and R3 via cable 120 and bi-directional line 74. Bidirectional line 74 and cable 120 may be any suitable media such as coaxial cable, shielded and unshielded twisted pair wiring, fiber optic line, radio channels, and the like. The LAN in which the host resides may assume a variety of topologies, including ring, bus, star, etc. Further, these LANs may have different physical configurations such as token ring (IEEE 802.5), ethernet (IEEE 802.3), and fiber distributed data interface or "FDDI" (ANSI X3T9.5).

At any one time, one of the routers R1, R2, or R3 assumes the state of active router, a condition requiring that it emulate the virtual router R4. The host H is configured to point to virtual router R4, regardless of which real router (R1, R2, or R3) is currently emulating it. Thus, when the host H needs to send data packets outside of LAN L, it directs them to virtual router R4. A virtual router in this invention is defined by virtual MAC layer and network layer (e.g., IP) addresses which are shared by a group of routers running the protocol of this invention. The router selected by the protocol to be the active router (R1, R2, or R3 in this case) adopts these virtual MAC and network layer addresses—possibly in addition to its own addresses—and thus receives and routes packets destined for the group's virtual router. In the router group shown of FIG. 2a there will be 4 pairs of addresses (each pair includes a MAC and a network layer address): one for router R1, one for router R2, one for router R3, and one for the group or virtual router R4.

One of the routers in the group (R1, R2, or R3) assumes the state of standby (or backup) router. When the standby router detects that the active router has failed, it takes over as the active router by adopting the group's MAC and IP addresses. A new standby router is automatically selected from among the other routers in the group—assuming there are more than two routers in the group. In the simple example provided in FIG. 2a, if the router R1 is initially the active router, the host will send packets through R1 because R1 has adopted the MAC and network layer addresses of R4.

Further, if router R2 is the standby router, a failure by R1 will cause R2 to become the active router. After such failure, the host will continue sending data to the MAC and IP addresses of R4 even though that data is now transferred though a different router. It is important to recognize that any router in a standby group can assume the roles of standby or active router.

Further, a new router within the group may attempt a coup of the active router if it believes that it meets the conditions necessary to perform as active router. In this case, the new router (e.g., R3) first determines whether it has "priority" over the current active router (explained below). If so, it issues a coup message and the current active router resigns, whereupon the new router takes over the status of active router.

The procedures of selecting active routers based upon priority has some elements in common with the procedures employed in the routing protocols OSPF and IS-IS. However, unlike these conventional routing protocols, the goal of the present invention is to provide an active router which emulates a virtual router for a host's benefit. Further, the present invention provides a mechanism by which the preempt capability (ability to coup) can be switched off so that the new router does not automatically take over as active router when it enters the network group. This new feature is desirable because network operation may be delayed for a short period while the coup takes place. Thus, the ability to switch off the preempt capability may prevent unnecessary system delays.

Referring now to FIG. 2b, a network segment having two groups of routers is shown. Such network segments are appropriate when different hosts on a LAN have their own standby groups of routers. In other words, each host has its own active router, standby router, and new routers (if there are more than two routers in the standby group). Each such standby group connected to the LAN follows the protocol for emulating a virtual router and selecting active and standby routers as described above. Employing multiple standby groups might be beneficial in a situation where different groups of users within an organization (a marketing group and a finance group, for example) share the same LAN. The marketing group may use one standby group of routers to send packets outside of the LAN while the finance group uses another standby group to send its data packets outside of the LAN. In FIG. 2b, host H1 has a standby group of routers 124. This group includes real routers R1 and R2 as well as virtual routers R3. Similarly, host H2 in LAN L sends its data packets through standby group 126 on network N. Standby group 126 includes real routers R5, R6, and R7 together with virtual router R4. All routers connected with LAN L are connected through cable 130. Each of standby groups 124 and 126 has its own network layer and MAC addresses which are adopted by the active router emulating the virtual router. In some situations, a given router may exist in two different groups. For example, in FIG. 2b, router R5 might exist in group 124 as well as group 126. To do so, it would have to be configured to adopt the MAC addresses for virtual routers R3 and R4 as well as it own physical MAC address. In theory, such a router could be a member of as many groups as the number of additional MAC addresses it could adopt.

In each of the above examples, the standby group included at least two routers. In preferred embodiments, standby groups include at least three real routers. However, some redundancy can also be obtained with a single router and two interfaces using "dial backup." In this embodiment, one interface is designated a primary interface and the other a backup. When the primary interface fails, the backup interface begins to be used.

The standby protocol of this invention can be run on any of a number of transport protocols including TCP ("Transmission Control Protocol"), UDP ("User Datagram Protocol"), CLNP, and XNS ("Xerox Network System"). Preferably, UDP is used as the transport protocol of this invention.

As noted above, the routers of this invention preferably run on an IP network layer. However, their application is not limited to any specific network layer protocol. For example, the standby protocol of this invention could also run on IPX which is a network layer protocol used underneath "Netware"™ available from Novell, Inc. of Provo, Utah. When the standby protocol of this invention is implemented for IPX, an active router must emulate a virtual IPX router rather than a virtual IP router. Such an active router will be the only router in the group to respond to GNS ("Get Nearest Server") requests issued by hosts.

It should also be recognized that the protocol of this invention can in some circumstances be used to emulate virtual bridges (as opposed to virtual routers). For example, SRB ("source routing bridging") is a protocol allowing for multiple bridges operating in parallel. In implementing this invention in SRB, one bridge from a group would have to emulate a virtual bridge. For example, a virtual bridge number could be employed in much the same manner as the virtual IP addresses used for router standby groups.

3. A Router Enters or Leaves the Network Group

In a preferred embodiment, routers enter and leave the network according to a procedure which efficiently determines whether an active router must be replaced, and if so, determines how that router is to be replaced. A router may leave a network segment in one of two ways: (1) it can simply go down without first notifying the other routers, or (2) it can officially resign by broadcasting its departure. Examples of the first case include a router abruptly losing power, crashing, system reloading, etc. Examples of the second case include scheduled maintenance, etc. Generally, the broadcast resignation is preferable because it allows other routers in the network to take immediate steps and thereby smooth the transition. A router which leaves the group can subsequently reenter, but can not immediately assume the role of active or standby router. The reentering router will have to await appropriate circumstances before assuming such a role.

To negotiate with one another for the statuses of active and standby routers, the routers of the this invention can send three types of relevant messages: hello messages, coup messages, and resign messages. Hello messages notifies other routers in the network that a particular router is operational in the system. The format of such hello message is generally similar to that of the hello messages used in protocols such as OSPF. Coup messages from local routers tell active routers that a local router wishes to take over as the active router. Resign messages tell the other routers that an active router wishes to leave its post.

Depending upon the current router's state and the information contained in each of these messages, a given router may or may not change its state. Most generally, the routers of this invention can assume one of three states: new, standby, and active. As will be explained below, a new router actually resides in one of four substates. Active routers have adopted their group's virtual IP and MAC addresses and therefore handle packets from the group's host that are directed outside of its LAN. The standby router is available to immediately take over as active router if the current active router should fail or resign. Both active and standby routers issue periodic hello messages to let the other routers on the network know their statuses. New routers may listen for these hello messages and may under some circumstances issue their own hello messages or attempt a coup of the active router.

If an active or standby router fails or otherwise leaves a standby group, it will simply stop sending hello messages. At the end of a defined length of time during which no hello messages are received from the active router, the standby router will take over. The new routers in the segment will then conduct an election to install a new standby router in place of the one that took over as active router. If neither the active router nor the standby router is functioning, the new routers will conduct an election to fill both the active and standby slots. In this case, the new router with the highest priority assumes the role of active router and the new router with the second highest priority assumes the role of standby router.

When a standby router receives an active router's resign message (when, for example, it is being taken down for scheduled maintenance), the standby router automatically assumes the role of active router. At the same time, the new routers (having also received the resign message) anticipate that there will not be a standby router and conduct their own election. As a result of the election, a new standby router is installed from among the group of new routers.

As suggested, each router has a specified priority which is used in elections and coups of the active router. A priority is configured for each router by a user of the network. The priority of each router is preferably an integer between 0 and 255 (i.e., an 8 bit word.) with 100 being the default. Generally, the router having the highest priority should be the active router and the router having the second highest priority should be the standby router. When routers enter or leave the network group, the priority-based elections and coups of this invention smooth the transition so that the group routers can quickly and with minimal disruption assume their correct status in the system. In the event that two routers having the same priority are seeking the same status, the primary IP addresses of these routers are compared and the router having the higher IP address is given priority.

Figure 3:
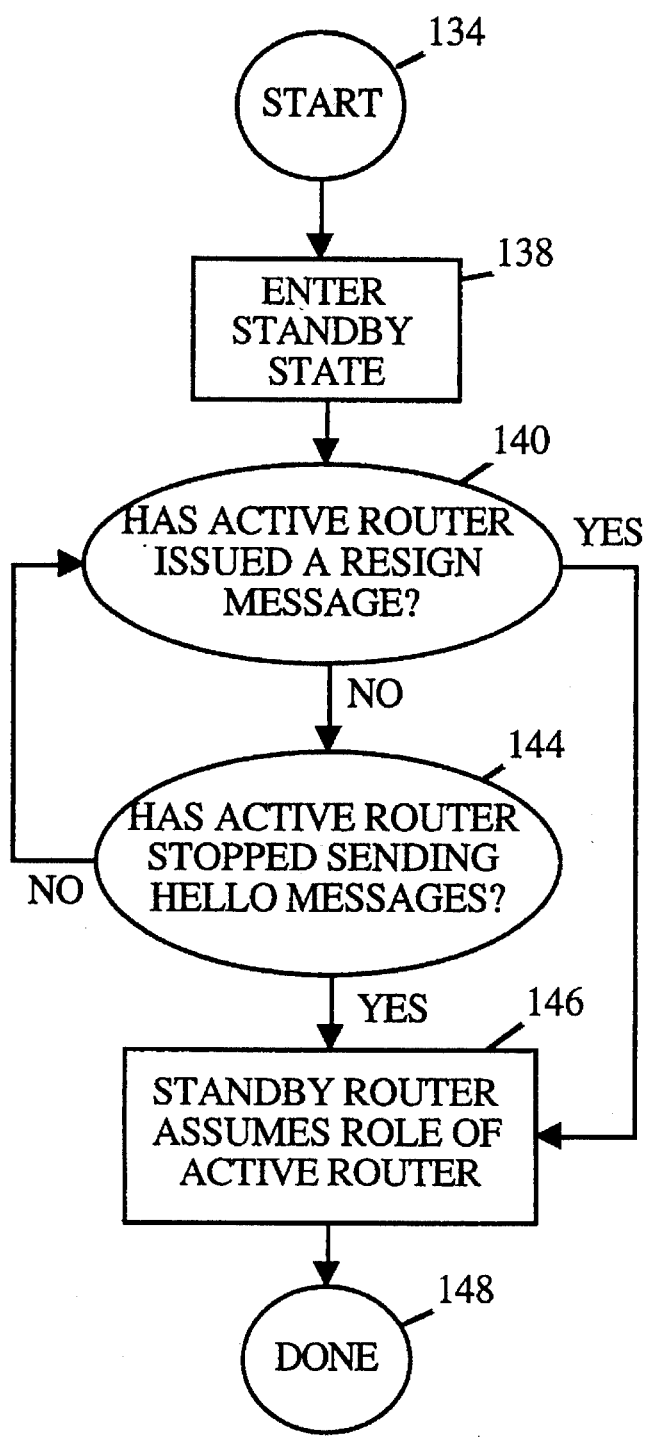
FIG. 3 is a process flow diagram showing generally the steps involved in replacing a departing active router (which emulates the group virtual router) with a standby router.
Figure 4:
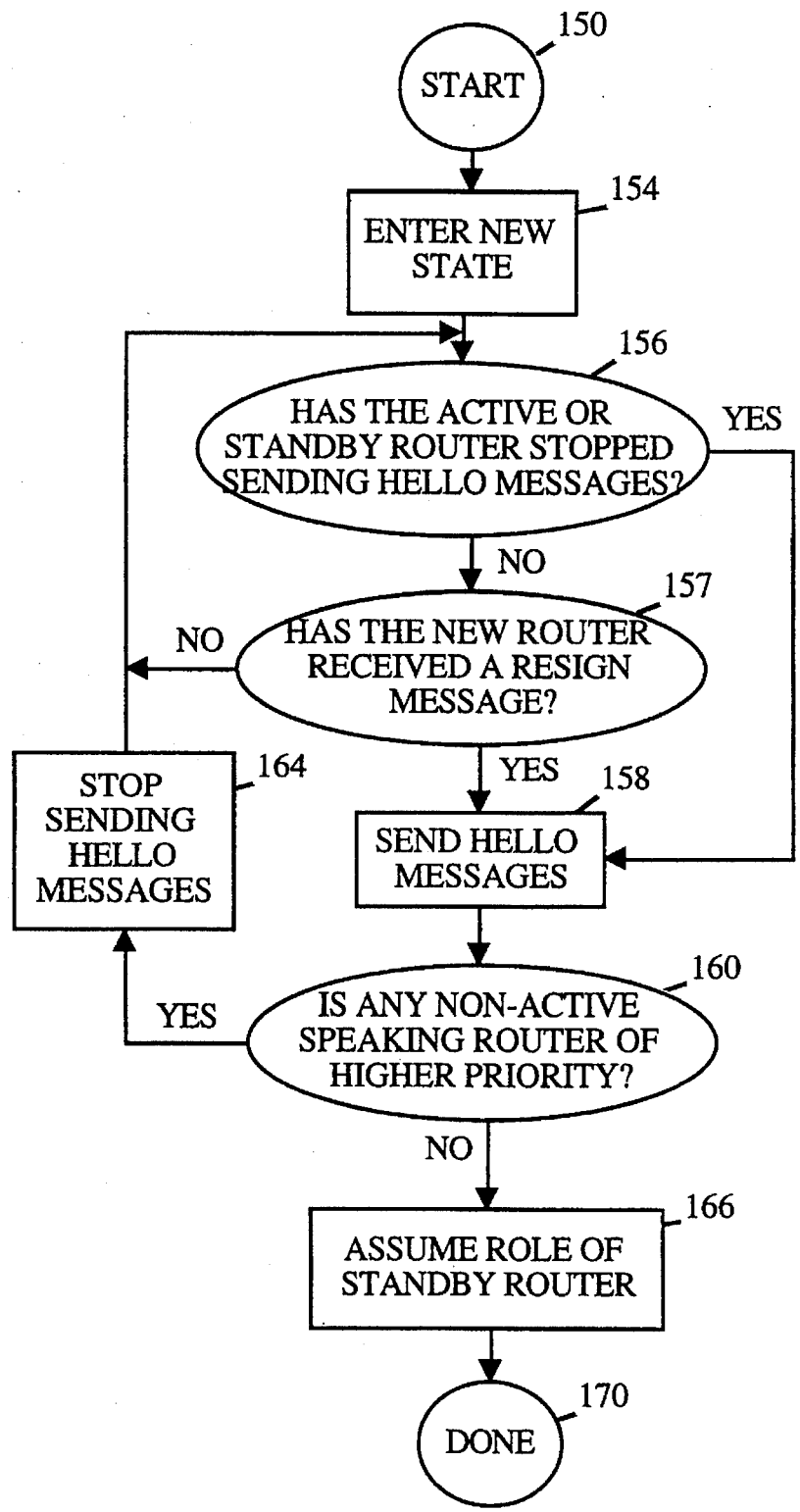
FIG. 4 is a process flow diagram showing the steps involved in replacing a departing standby router with a new router from a group of routers.

Two important events in this invention are detailed in the flow charts of FIGS. 3 and 4. The first of these involves a standby router taking over for an active router which has left its standby group for some reason. The second of these involves a new router taking over for a standby router which has assumed the role of designed router. It should be understood that these flow diagrams as well as the others presented herein are provided as convenient representations to aid in understanding the state transitions of router used in this invention. Some of the flow diagrams are organized in a manner that could imply that the system checks for certain actions by event loops or polling. No such limitation is intended. Thus, the process flow charts presented herein should not be read to imply that the system necessarily checks for events in the order listed.

FIG. 3 presents a process flow diagram showing the conditions under which a standby router takes over when an active router leaves its standby group. It should be understood that a standby router can become active under other circumstances (i.e., receipt of a lower priority hello from the current active router when the standby router is configured to preempt). For purposes of FIG. 3, however, it is assumed that the active router has left without provocation from another router. The other cases will be addressed in the discussion of FIG. 5 and elsewhere. The process of FIG. 3 begins at 134 and in a step 138, the router under consideration enters the standby state. Next, the standby router determines whether the current active router has issued a resign message in a decision step 140. If not, the standby router determines whether the active router has stopped sending hello messages in a step 144. As long as decision steps 140 and 144 are answered in the negative, the standby router continues to await an event in which one of these decisions can be answered in the affirmative. When that happens, the standby router assumes the role of active router in a step 146. Thereafter, the process is concluded at 148.

FIG. 4 shows how a router in the new state can take over for a standby which has left its post in the standby group. The standby router could be asked to relinquish its post by another router, but that situation will not be addressed here. The process begins at 150 and in a step 154, the router under consideration enter the new state. Next, in a decision step 156, that router determines whether the active or standby routers have stopped sending hello messages. If not, the router determines whether it has received a resign message in a decision step 157. The router continues asking the questions posed in steps 156 and 157 until one is answered in the affirmative. At that point, the router begins sending its own hello messages at step 158. Thereafter in a decision step 160, the new router determines whether any non-active router which is currently speaking has a higher priority than its own. If not, the new router assumes the role of standby router at a step 166 and the process is concluded at 170. If, on the other hand, decision step 160 is answered in the negative, the new router stops sending hello messages at step 164 and the process control returns to decision step 156.

The above discussion of FIG. 4 assumes that only the standby router will need to be replaced. Normally, when an active router stops sending hello messages, the standby router will take over after the hold time expires. It then begin sending its own hello messages (as active router) before the next hold time for the active router expires. Thus, the new routers recognize that they are not to take over for the previous active router. However, if both the active and standby routers have left their posts, then the new router with the highest priority will actually take over the role of active router. The process is essentially identical to that outlined in FIG. 4, except that the new router assumes the role of active router after first assuming the role of standby router at step 166.

The abrupt departure of an active or standby router from the network group without first issuing a resign message is noted by the other routers in the system by the absence of a hello message. Normally, the active and standby routers send periodic hello messages—once every predefined "hellotime." However, as indicated in FIG. 4, new routers which have not discovered an active router within "holdtime" may also send hello messages. That is, when a new router does not hear a hello message from a standby and/or active router within a predefined period known as a "holdtime," the new router begins sending its own hello messages. In a preferred embodiment, the default hellotime is between about 1 and 3 seconds and the default holdtime is between about 3 and 10 seconds. Typically, the hold time is at least three times the hello time. All routers in the same group use the same hellotime which may be specifically configured by a user. In a preferred embodiment, all hello messages are sent using the all-routers IP multicast address 224.0.0.2. The source address of the hello message is the router's primary IP address, and not the group's active IP addresses.

In addition to source address, the hello message contains the following items:

The active IP address
The hello time
The hold time
The routers priority
The routers status (active, standby, new)
Authentication
A version number
A group number The authentication is the same for each router in the group and is provided as a password to ensure that the routers in the system get their information regarding hellotime, holdtime, dynamic IP address, etc. from a packet issued by a router within their group. The version number represents the implementation of the standby protocol. The group number represents the standby group which issued the hello message.

As explained, when non-active routers on the network do not hear a hello from the active router within a holdtime, they may take steps to change their status. In the case of the current standby router, if it sees the hold time expire on the active router, it immediately becomes the active router. In the case of the new router, if it sees the hold time expire on the standby router, it then sends a hello message (i.e., it enters "speak" state). If within another hold time, no other routers other than the designed router send a hello message of higher priority, then the new router assumes the status of standby routers. If, on the other hand, while sending hello messages, a given new router receives a hello message of higher priority from another new router, then the given new router stops sending hello messages and becomes ineligible to take over as the standby router (at least temporarily).

An active router which decides to leave the network should first send a resign message so that the standby router can take over smoothly. Only the active router is permitted to send a resign message. In response to a resign message, the standby router automatically becomes the active router. In response to the same resign message, the new routers begin sending hellos as part of an election to see which one of them takes over as standby router. If a given router hears no hello messages of higher priority than his own within a hold time, that router takes over as the standby router. The resign message includes all information found in the hello messages, but only the status and authentication fields are particularly pertinent.

Routers may enter a standby group for various reasons such as having previously lost power or otherwise failed. As explained, there are two scenarios under which the reentering router may assume the role of active router within the standby group. Which of these scenarios is employed depends upon whether the incoming router is configured to "preempt" an active router. If it is, the entering router sends a coup message to the current active router when it believes it has priority over that router. After the coup message is received by the current active router, the priorities of the entering and active routers are compared. If the entering router has a higher priority, the current active router resigns and the incoming router takes over.

If an entering router is not configured to preempt, it can send no coup messages to the active router. However, it can become a designed router indirectly. For example, it can first become a standby router by taking over for a failed standby router as described above. After the incoming router assumes standby status, it automatically takes over for the current active router when that router fails or resigns.

Figure 5:
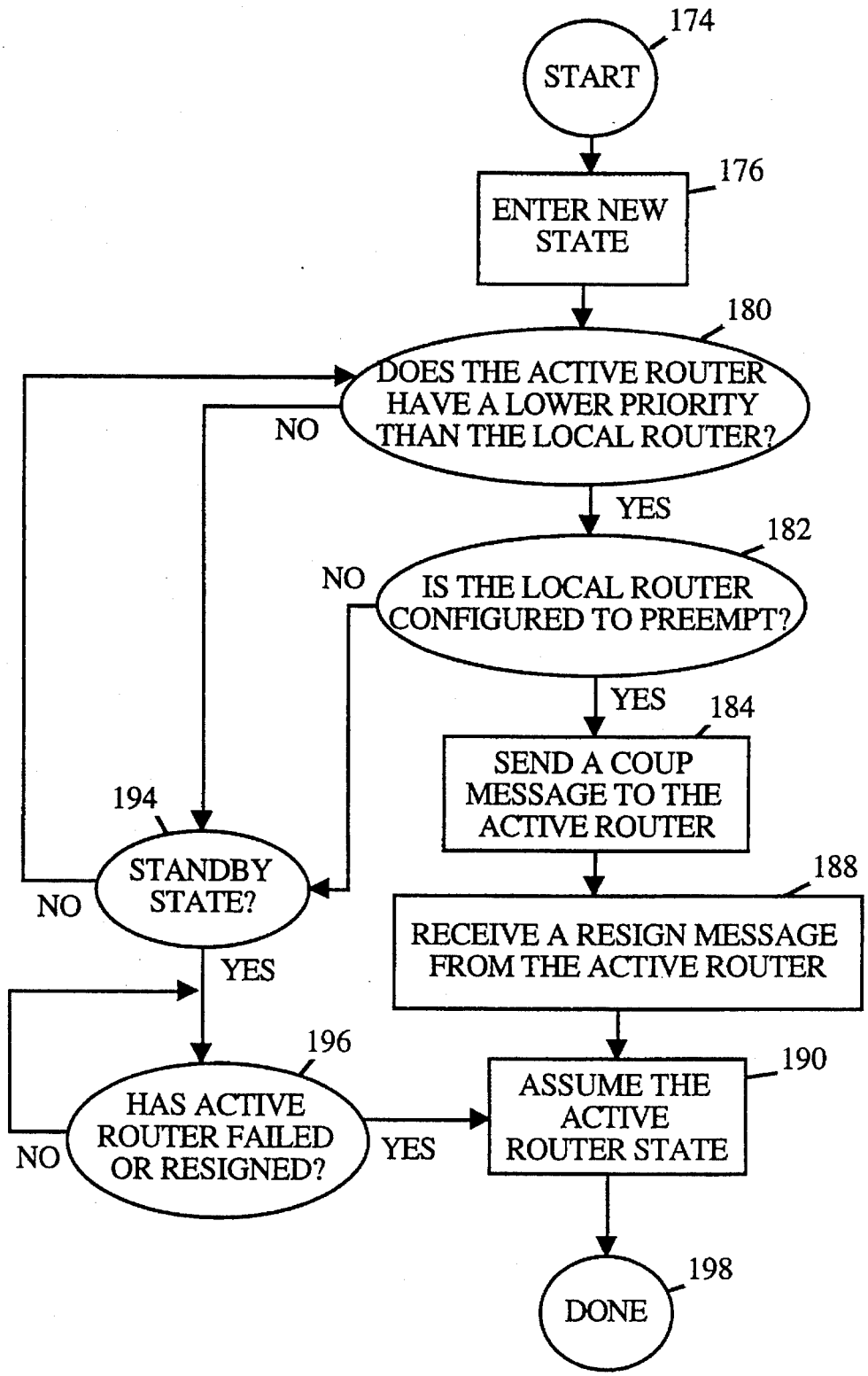
FIG. 5 is a process flow diagram presenting the processes by which a new router entering a network segment can become an active router in accordance with this invention.

Some options available to a new router entering a standby group are detailed in FIG. 5. The process begins at 174 and proceeds to a step 176 where the entering router assumes the new state. Thereafter, in a decision step 180, the new router determines whether the active router in its standby group has a lower priority than itself (preferably by analyzing hello messages from the active router). If so, the new router then determines in a decision step 182 whether it is configured to preempt. If so, it sends coup message to the active router at a step 184. It then receives a resign message from the active router at step 188. Finally, it assumes the status of active router at step 190 and the process is completed at 198.

The protocol of this invention provides for the event in which a coup or resign message is lost or not received by the new router. If a coup message is lost, there will simultaneously be two active routers. In such situations, the lower priority active router (i.e., the original active router) will receive a hello message from the other active router within the next hello time after the new router assumes active status. Upon receiving such hello message, the original active router will immediately relinquish its active status and revert to new router status. If a resign message from an active router is lost, the other routers in the group will quickly determine that the active router is no longer present by the absence of a hello message from the active router. As explained, if no hello message is received from an active router within a hold time, the other routers in the group take steps to fill the role of active router and, if necessary, standby router.

Returning again to FIG. 5, if either of decision steps 180 or 182 is answered in the negative, the new router determines whether it can enter the standby state at a decision step 194. It can enter the standby state by waiting for the current standby router to leave the group or assume active router status as detailed in FIG. 4. Alternatively, the new router can listen for hello messages from the standby router and then compare priorities. If the standby router has a lower priority, the new router sends its own hello message to let the standby router know that it should relinquish its role. Assuming that the new router can not yet enter the standby state (i.e., decision step 194 is answered in the negative), the new router simply waits until an active router with a lower priority takes over or the new router itself can assume the standby state. That is, either decision step 180 or decision step 194 is answered in the affirmative. Assuming that decision step 194 is answered in the affirmative, the new router determines whether the currently active router has failed or resigned at decision step 196. This is detailed in FIG. 3. When such event occurs, the router assumes the role of active router at step 190 (i.e., decision step 196 has been answered in the affirmative).

The procedure for determining the active router's priority (step 180) involves first listening for a hello message issued by the active router. When such a hello message is received, the new (listening) router checks the priority in that message against its own priority. If the new router determines that it has a higher priority than the active router and it is configured to preempt, the new router immediately broadcasts a coup message to the active router. The coup message includes the same fields as contained in the hello message, but only the priority, status, and authentication fields are particularly pertinent.

From the active router's standpoint, when it receives an acceptable coup message (i.e., one from a router having a higher priority than it own) it resigns from the status of active router. This involves removing the group MAC address from its address filter and then unicasting a resign message to the sender of the coup message. The active router then returns to the new state. If the resign message would be broadcast rather than be unicast, the standby router—as well as the router sending the coup message—would transition to active state.

4. The Router as a State Machine

Figure 6:
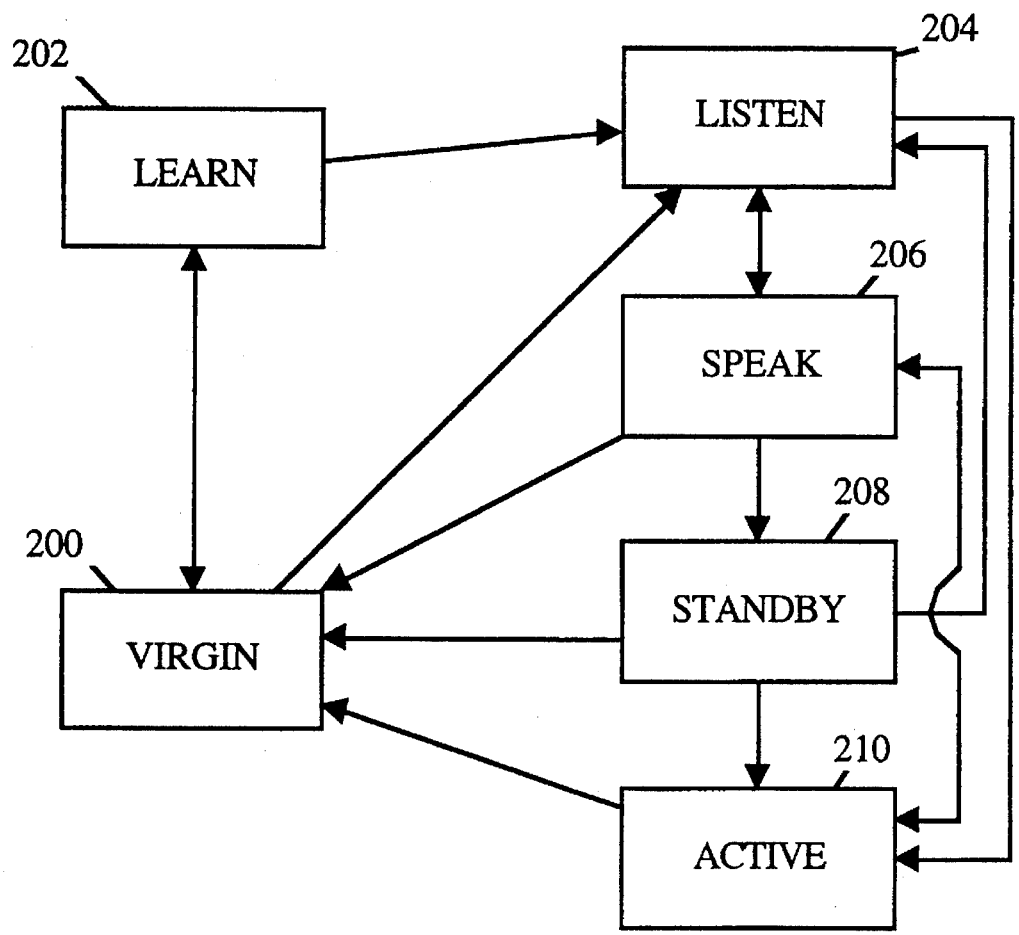
FIG. 6 is a state diagram of a router in a preferred embodiment of this invention.

FIG. 6 is a state diagram showing the acceptable state transitions of a router of this invention. As discussed above, the routers of this invention generally include three states: new, standby, and active. However, the new state can be further divided into four substates: virgin 200, learn 202, listen 204, and speak 206. Typically, the virgin state 200 is entered when the router undergoes a configuration change or when the interface of the standby group first comes up. Further, if the protocol of this invention is disabled on a network segment, all routers on that segment enter the virgin state. A router in the learn state 202 listens to hello messages from the current active router in order to learn "minimal information" (i.e., the hello and hold timers and virtual IP address). This minimal information is relearned any time it is heard regardless of the router's current state. It should be noted, however, that the information is learned only if the authentication in the packet containing the information matches that of the current router. Once a router in the learn state 202 has learned the minimal information, it transitions to the listen state 204 were it continues to listen to hello messages from both the active and standby routers. A router in the speak state 206 sends a hello message once every hello time. Routers in the learn and listen states send no hello messages. As noted above, routers in the active state 210 and standby state 208 send also send and listen for hello messages.

The state chart shown in FIG. 7 will now be described with reference to eleven different events of significance to the routers of this invention. These events are the following:

1—Hot standby protocol configured on an interface.

2—Hot standby protocol disabled on an interface.

3—ActiveTimer expiry.

4—Receive Hello of higher priority router in Speak state.

5—Receive Hello of higher priority Active router.

6—Receive Hello of lower priority from Active router.

7—Receive a Resign message from Active router.

8—Receive a Coup message.

9—StandbyTimer expiry.

10—Receive Hello of higher priority Standby router.

11—Receive Hello of lower priority from Standby router.

The first event is configuring the protocol of this invention on a network segment. The virgin state is the only router state existing at this point. As shown in FIG. 7, the virgin routers start their "active" and "standby" timers. The active timer sets the hold time associated with the active router. If the active timer expires without a hello message being received from the active router, the group may assume that their active router is inoperative. The standby timer performs a similar function for the standby router. After active and standby timers have been started, a router transitions to either the learn or listen state depending upon whether minimal information (this is the timer information and IP address) has been discovered. If the minimal information has been discovered, the system transitions to the listen state. Otherwise, it transitions to the learn state.

Disabling the protocol of this invention on a network segment is the second event of note shown in FIG. 7. This causes routers in every state to first clear their active and standby timers and then reenter the virgin state. The active router, in addition, sends a resign message before entering the virgin state.

The third event of note is expiration of the active timer. This indicates that a router has not received a hello message from the active router within the hold time. This has no effect on routers in virgin, learn, and speak states. However, routers in the standby state immediately cleat their active timers and assume the status of active router, thus serving their function as backup. In addition, routers in the listen state restart their active and standby timers and transition to the speak state upon expiration of the active timer. This permits those routers to be considered for the role of standby router, which has now been vacated.

The fourth event of note is receipt of a hello message from a router in the speak state having a higher priority than the router receiving the hello message. This effects only those routers in the speak and standby states. Any router in the speak state receiving such a message, discontinues sending hello messages and reverts to the listen state. Thus, only the router speaking with highest priority remains in the speak state and thereby eligible for promotion. If a standby router receives a hello message from a speaking router having a priority higher than its own, it starts its standby timer and reverts to the listen state. This would occur when a new router arrives after there are already active and standby routers, and the new router has a higher priority than the current standby router.

Hello messages from the active router can be expected to contain a priority that is higher than that of the receiving router. When this occurs (the fifth event of note in FIG. 7), routers in the virgin, learn, listen, speak, and standby states learn the minimal information (denoted as "snoop" in FIG. 7). In addition, these routers restart their active timers. Routers in the learn state further start the standby timer and transition to listen state. If a router currently in the active state receives a hello message from another active router which has a higher priority, the active router receiving this message immediately restarts its active and standby timers and transitions to the speak state.

In some instances, most notably when a high priority router reenters the standby group, a router may receive a hello message from an active router having a priority lower than its own (the sixth event of note). In this case, routers in the learn, listen, speak, and standby states learn the minimal information and restart their active timers. Routers in the learn state also, start their standby timer and transition to the listen state. Routers in the listen, speak, and standby states have the option of issuing a coup message. More specifically, if these routers are configured to preempt the active router, they will issue a coup message. Otherwise, they will remain in their current state. If a coup message is sent, routers in the listen, speak, or standby state then clear their active timer and transition to the active state. Routers in the listen and speak states also restart their standby timers. If a router currently in the active state receives a hello message from a different active router having a lower priority, the active router receiving the message then issues a coup message.

In response to a coup message, an active router may issue a resign message (the seventh event of note in FIG. 7). Alternatively, if the active router decides on its own to relinquish it role as active router, it will also issue a resign message. Regardless, of the circumstances under which the resign message is issued, a router in the listen state receiving such message starts its active and standby timers and transitions to the speak state. A router in the speak state starts its active timer. Finally, a router in the standby state clears its active timer and transitions to the active state.

As noted, a coup message may only be received by the active router. When it receives such a message (the eighth noteworthy event), it sends a resign message, restarts its active and standby timers, and transitions to the speak state.

The ninth event of interest is expiration of the standby timer. When this occurs, routers in the listen state restart their standby timers and then enter the speak state. Of those routers that enter the speak state, the one having the highest priority will automatically transition to the standby state. If the standby timer expires while a router is in the speak state, that router then clears its standby timer and assumes the status of standby router.

When a router receives a hello message from a standby router (the tenth noteworthy event), the priority is checked. If that priority is higher than the priority of a receiving router in the listen, speak, standby, or active states, the router restarts its standby timer. If the receiving router is currently in the speak state, it then transitions to the listen state. If the router is currently in the standby state, it also, transitions to the listen state. Otherwise, there would be two routers in the standby state.

Finally, a router may receive a hello message from a standby router of a lower priority. A router in a listen state receiving such a message restarts its standby timer and transitions to the speak state. A router in the speak state receiving such a message clears its standby timer and transitions to the standby state. The previous standby router would have already relinquished its role in response to a hello message from the router in the speak state.

5. Emulation of a Virtual Router

As noted, real routers currently emulating a virtual router adopt their group's MAC and network layer (e.g., IP) addresses. The user setting up the routers in the group can provide the group IP address by routine programming. Thus, the physical router elements involved in designating a virtual IP address include the main CPU and main memory. MAC addresses are typically provided in an address filter or "list" of MAC addresses in a router's interface controller. The procedure involved in inserting or removing a MAC address from the address filter depends upon the particular router being configured, but generally involves only routine programming. Preferably, the routers of this invention are able to add virtual MAC addresses to their controllers' MAC address filter while maintaining their primary MAC addresses. In some cases, a router will actually be capable of having multiple virtual MAC addresses while maintaining its primary MAC address. A technique for handling routers which are unable to handle more than one MAC address in their address filters is presented below.

In a token ring arrangement, the virtual MAC address can be obtained from 1 of 32 well-known "functional addresses" used by protocols over token ring. It is important to choose a functional address that is not going to be used in the system in which the standby protocol is running. One such suitable MAC address for token ring arrangements has been found to be C000.0001.0000.

In broadcast-based LANs with location insensitive link layer addresses (e.g., ethernet and FDDI LANs), the virtual MAC address can be purchased from the IEEE. Suitable MAC addresses may be 1 of 256 addresses selected from the range 000.0c07.ac00 thru 0000.0c07.acff. The last octet of this MAC address equals the standby protocol group number.

Unfortunately, some router controllers support address filtering for only one unicast MAC address. Such routers can still be used in the standby protocol of this invention, but the protocol must change the interface's primary MAC address when assuming or relinquishing control as the active router. This is potentially problematic because some traffic may otherwise wish to use the router's primary MAC address. However, the problem can be mitigated by having the router send out gratuitous ARP ("address resolution protocol") packets so that other network entities using IP update their ARP tables to reflect that the router is now using a group virtual MAC address rather than its primary MAC address.

While running the standby protocol, it is important to prevent the host from discovering the primary MAC addresses of the routers in its standby group. Thus, any protocol which informs a host of a router's primary address should be disabled. In IP, one such protocol involves sending ICMP redirect packets. These are intended to tell a host of the existence of alternative routes and in so doing require the host to discover a router's primary address. For example, if the active router receives a packet and decides that the optimal route is through the standby router, the active router could, under normal circumstances, send redirect instructions (an ICMP redirect packet) to the host. This would tell the host to use the standby router, and the host would then issue an ARP request for the standby router's primary address. Thereafter the host would route packets through the standby router and would use the real standby router MAC address (as opposed to the group virtual MAC address). Thus, the host is again susceptible to failure if the standby router goes down. In this invention, this difficulty is overcome by disabling the group routers' capacity to issue ICMP redirect packets so that the host can never discover a router's primary MAC address. This disabling can be accomplished by simply programming the group routers such that they do not send out ICMP redirect packets when the standby protocol of this invention is running.

Various emulation functions of this invention can be configured on a router by programming or encoding special instructions. Such functions include (1) blocking ICMP redirect packets from being sent when the standby protocol is running, (2) changing a router's status in response to certain events, and (3) the ability to control a router's preempt capacity. These functions are generally implemented in the same manner as they would be in any general purpose router or digital computer. That is, the instructions for a function are processed by one or more processing units (such as a CPU chip) and stored in dynamic volatile memory, ROM, dynamic non-volatile memory, etc.

In a preferred embodiment, configurations for IP addresses are stored in dynamic non-volatile memory of a router. Group addresses are hard-coded into the system software. Packet forwarding is supported by system software, and requires configuration information from dynamic non-volatile memory. Further, packet forwarding functions learn information from routing protocols which get stored in dynamic volatile memory.

Although the foregoing invention has been described in some detail for purposes of clarity of understanding, it will be apparent that certain changes and modifications may be practiced within the scope of the appended claims. For instance, although the specification has described routers, other entities used to send packets from a host in one LAN to destinations outside of that host's LAN can be used as well. For example, bridges or other less intelligent packet switches may also employ the standby protocol of this invention. Further, the above-described preferred embodiment describes protocols in which routers compare priorities to determine which of them should become the active router and which of them should become the standby router. Within the scope of this invention, various other methods can be used to conduct elections to determine active and standby routers. For example, a router's current and recent parameters may be used to adjust its priority.

What is claimed is:

1. A router for use with a network segment having a plurality of routers and a plurality of hosts which address data packets to an active router from the plurality of routers, the router having a memory and a processor and comprising:

a primary router address stored in the router;

a group virtual address stored in the router, which group virtual address is adopted by the router when it becomes the active router of the network segment;

means for adopting the group virtual address;

means for issuing a coup message to notify a current active router that the router will attempt to become the active router; and means for disabling, at least temporarily, the means for issuing a coup message.

2. The router of claim 1 further comprising means for assuming a status of standby router for backing up the active router.

3. The router of claim 1 further comprising:

a priority specifying the router's relative likelihood of becoming the active router in comparison to other routers in the network segment; and means for automatically comparing the priority of the router with the priority of the current active router in the network segment.

4. The router of claim 1 further comprising:

means for issuing a resign message; and means for removing the group virtual address from an address filter after the resign message has been issued.

5. The router of claim 2 further comprising means for issuing a hello message to notify other routers in the network segment that the router is operating.

6. The router of claim 5 further comprising:

means for detecting when a hello message has not been received from the current active router within a predetermined time; and means for automatically changing from the status of standby router to the status of active router when no hello message has been received from the current active router within said predetermined time.

7. The router of claim 5 wherein the hello message includes a router priority, a router status, and the group virtual address.

8. The router of claim 1 further comprising:

means for automatically inserting the group virtual address into an address filter when the router assumes the status of active router; and means for removing the group virtual address from the address filter when the router resigns the status of active router.

9. The router of claim 1 wherein the means for adopting the group's virtual address includes an address filter.

10. A network segment providing a redundant routing capability, the network segment comprising:

at least one host on a LAN, said host including means for addressing data packets to a virtual router;

at least two physical routers connecting the host's LAN to at least one other network segment, each router capable of assuming the states of active and standby router, the active router communicating with the host and the standby router backing up the active router; and means for selecting the active router and the standby router from among the at least two routers, wherein said active router includes means for emulating a virtual router, and wherein each physical router is provided with the ability to issue coup messages for notifying the active router that the physical router will attempt to become the active router, and wherein the ability to issue coup messages can be disabled at least temporarily.

11. The network segment of claim 10 further comprising means for automatically replacing the active router with another router when predetermined criteria are met by causing the other router to emulate the virtual router and causing the active router to discontinue emulating the virtual router.

12. The network segment of claim 11 wherein the means for replacing the active router includes:

means for determining when a router having a higher priority than the active router enters the network; and means for disabling, at least temporarily, the means for replacing the active router with another router.

13. The network segment of claim 11 wherein the means for replacing the active router includes:

means for determining when the active router is no longer functioning; and means for automatically replacing the active router with the standby router by causing the standby router to emulate the virtual router and the active router to discontinue emulating the virtual router.

14. The network segment of claim 10 further comprising means for preventing the host from communicating directly with the active router.

15. The network segment of claim 14 wherein the means for preventing the host from communicating with either the standby or active router includes a means for preventing ICMP redirect packets from being sent to the host by routers in the group.

16. The network segment of claim 10 wherein the virtual router has an IP address and a MAC address, each of which is distinct from the IP and MAC addresses of the two or more routers.

17. The network segment of claim 16 wherein the MAC address is an FDDI or ethernet MAC address for a nonfunctioning router.

18. The network segment of claim 16 wherein the MAC address is a token ring functional address which is unused by any IP protocols on the router.

19. The network segment of claim 10 wherein the means for selecting an active router and a standby router includes means for determining a priority of the routers in the network segment.

20. The network segment of claim 10 comprising at least three physical routers connecting the host's LAN to at least one other network segment.

21. A method of backing up a router with which a host communicates in a network having multiple routers, each router having a priority, the method comprising the following steps:

specifying an active router for routing data packets from the host;

specifying a standby router which backs up the active router;

causing said active router to emulate a virtual router;

causing the host to address data packets to said virtual router; and automatically selecting a new active router based upon a comparison of the priorities of the multiple routers in the network, wherein said active and standby routers are provided with the ability to issue coup messages for notifying another active router that the active or standby router will attempt to become the active router, and wherein the ability to issue coup messages can be disabled at least temporarily.

22. The method of claim 21 wherein the step of selecting a new active router includes:

detecting a coup message from a new router indicating that it wishes to take over as the active router; and selecting the new router as the active router if its priority is higher than that of the active router.

23. The method of claim 22 further comprising a step of determining whether the new router is configured to preempt the active router.

24. The method of claim 21 wherein the step of selecting a new active router includes:

determining when an active router has left the network; and if the active router has left the network, selecting the standby router as the active router.

25. The method of claim 21 further comprising:

detecting a resign message issued by the active router to notify the other routers in the network that it will be resigning from its status as active router;

causing the active router to stop emulating the virtual router; and causing the standby router to emulate a virtual router.

26. The method of claim 21 further comprising a step of replacing the active router with the selected new active router by causing the selected new active router to emulate the virtual router and causing the active router to discontinue emulating the virtual router.

27. The method of claim 21 wherein the step of causing the host to address data packets to the virtual router includes a step of configuring the host to address data packets to IP and MAC addresses for the virtual router.

28. The method of claim 27 further comprising a step of configuring the active router with the virtual router IP address to which the host is configured to address data packets.

29. A router for use with a network segment having a plurality of routers and a plurality of hosts which address data packets to an active router from the plurality of routers, the router comprising:

a memory;

a processor coupled to said memory;

one or more interfaces for sending and receiving data packets on a network, wherein said memory and said processor are adapted to provide (a) a primary router address and (b) a group virtual address which is adopted by the router when it becomes the active router of the network segment, and wherein said memory and said processor are adapted to (c) issue a coup message, through said one or more interfaces, to notify a current active router when the router will attempt to become the active router, and (d) disable, at least temporarily, the router's ability to issue a coup message.

30. The router of claim 29 wherein the memory and processor are further adapted to assume a status of standby router for backing up the active router.

31. The router of claim 29 wherein the memory and processor are further adapted to issue, through one of said one or more interfaces, at least one of a resign message to relinquish a status of active router or a hello message to notify other routers in the network segment that the router is operating.

* * * * *